Nov. 11, 1930.  H. E. CURTIS  1,781,443
BRAKING MECHANISM FOR MOTOR VEHICLES
Filed April 8, 1927
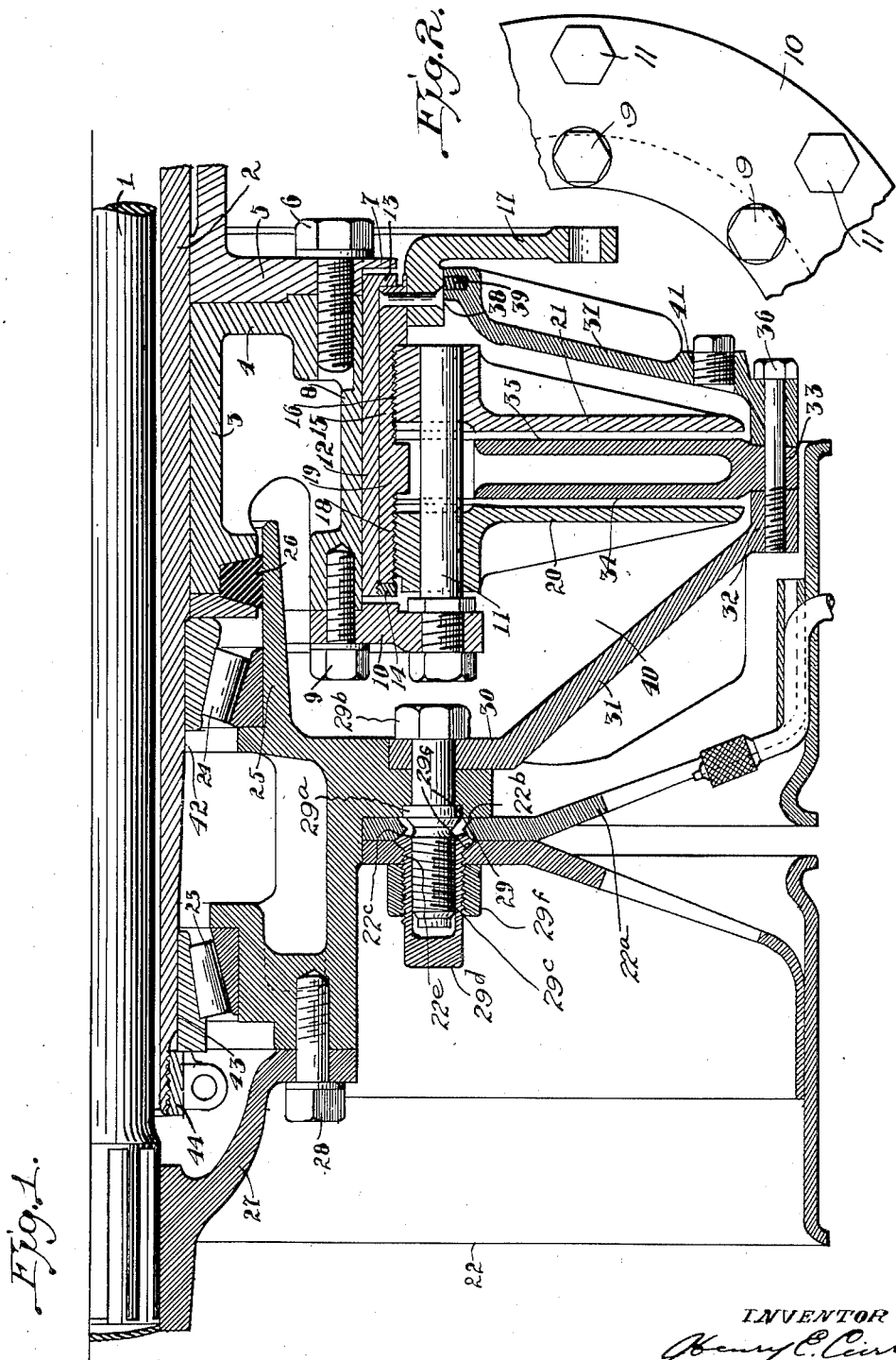

Patented Nov. 11, 1930

1,781,443

UNITED STATES PATENT OFFICE

HENRY E. CURTIS, OF SAN JOSE, CALIFORNIA

BRAKING MECHANISM FOR MOTOR VEHICLES

Application filed April 8, 1927. Serial No. 182,119½.

It is the object of the invention to provide a service brake structure that will be positive in action, smooth in operation, effectually guarded against overheating, and highly efficient in its practical application.

It is also an object of the invention to provide a structure of the character indicated that will be economical to manufacture, strong, durable, and quickly and easily assembled and disassembled.

In the drawing, Figure 1 is a sectional view through a portion of a brake embodying my invention.

Figure 2 is a detail elevation of plate 10, part broken away.

Referring more particularly to the drawing, I show at 1 a portion of a vehicle axle, and at 2 a portion of the axle housing.

On the axle housing 2 is mounted a collar 3 having a radial flange 4 abutting a flange 5 on the housing and secured thereto by bolts as 6, the flange 5 carrying a thin radial flange 7. The flange 4 supports an annular concentrically arranged part 8 to the end of which is bolted as at 9 a circular plate 10 carrying an annular row of pins as 11 parallelly arranged relative to the axis of the axle 1 and lying directly over the part 8. At 12 is shown a sleeve slidably mounted on part 8 and slightly shorter than the distance between parts 7 and 10 and having a stop flange 13 formed on one end and a stop threaded on to the other end as at 14.

On the sleeve 12 and engaging stop 13 is a member 15 externally threaded at 16 and fitted with an operating lever 17. In opposed relation to member 15 is a part externally threaded as at 18 but in the opposite direction to the threads on part 15, a spacer 19 being inserted between the threaded portions 16—18, and the three parts are held by the stops 13—14 to rotate as a unit with part 12.

Internally threaded discs 20 and 21 are mounted to engage the parts 18 and 16 and are slidably mounted on the pins 11. By means of this structure when the lever 17 is operated the parts 12, 13, 14, 15, 16, 18 and 19 are rotated a distance on part 8, and the discs through their threaded engagement with the parts 18, and 16 are moved toward or away from each other as the case may be. The part 12 is allowed a little longitudinal movement to insure equal pressure of the discs 20—21 as hereinafter described.

The structure above described is all mounted upon the axle housing and is fixed relative thereto. The rotating parts comprise a wheel structure designated generally by the character 22 mounted on the housing by means of bearings 23 and 24, the hub portion of the wheel carrying an inwardly extending annular flange 25 engaging a packing 26 inserted between it and the collar 3. The hub is closed at its outer end by means of a cap 27 engaging the end of the axle 1 and bolted to the wheel as at 28 whereby to drive the same.

Bolted to the hub portion of the wheel as at 29 is an annular disc 30 inclined inwardly as shown at 31 and provided with a peripheral flange 32. At 33 is shown an annular disc inserted between the two discs 20 and 21 heretofore described and having two working faces 34 and 35 presented to the two opposed discs as shown. This disc is fixedly mounted on the flange 32 by bolts as 36 which at the same time bind thereto an inner disc 37 which extends inwardly toward the axle 1 to a point 38 where it is fitted with a packing 39 inserted between it and the parts 15—17.

The construction described provides an enclosed chamber 40 into which a suitable lubricant is introduced through an opening 41 whereby all of the moving parts of the brake mechanism are thoroughly lubricated at all times, the said lubricant being carried to the outer portions by centrifugal force generated by the rotating parts.

The bolt 29 is provided with a flange $29^a$ that seats against the outer side of the hub portion of the wheel and engages a nut $29^b$ on its inner end whereby to secure the disc 30 in place. The outer end of the bolt is threaded as at $29^c$ so that when the inner half $22^a$ of the wheel 22 is placed in position the part $29^c$ will pass through orifice $22^b$ and receive a cap $29^d$ which bears against the wheel part $22^a$ as at $22^c$ to hold the same in place. The outer half of the wheel 22 may now be placed in position with the orifices as $22^e$ therein engaging the caps as 29ᵈ, the parts 22 being secured in position by the nuts 29ᶠ threaded on to the caps 29ᵈ. The inner end of the cap 29ᵈ is provided with a flange 29ᵍ which seats against the wheel portion 22ᵃ and which forms a seat to receive the wheel portion 22.

When the brake is applied through the operation of lever 17 the discs 20 and 21 are moved toward each other into engagement with the rotating disc 33 and operate to stop the same, the pressure being applied equally from both sides. This action is smooth and positive due to the arrangement of the operating mechanism whereby the pressure is graduated even though it is applied quickly, The mechanical arrangement of the parts is of importance because it renders the assembling or disassembling of the structure easy. The end of the housing 2 is diminished somewhat in its outside diameter as shown at 42 and 43 and is threaded to receive a nut 44. By removing the bolts 28 the cap 27 may be taken off, and removing the nut 44 permits removal of the bearing 23. Then by removing the bolts 6 the entire wheel and brake may be slipped off of the housing. It may be readily seen that the assembly of the brake itself is equally simple.

Since any desired means may be used for operating the braking mechanism, no means for that purpose has been disclosed.

It is to be understood, of course, that while I have herein shown and described but one specific embodiment of my invention, changes in form, construction, and method of assembly and operation may be made within the scope of the appended claims.

I claim:

1. The combination with a driving shaft of a motor vehicle, a wheel mounted thereon, and a housing therefor, of a drum fixedly and concentrically mounted on the housing, a sleeve mounted on the drum and provided with oppositely directed threads and means for rotating the sleeve a distance on the drum, a pair of opposed and spaced discs engaging the threaded portions of the sleeve and actuated thereby, means for preventing rotation of the discs, a double faced disc supported by the wheel between said opposed discs and engageable therewith, a housing portion mounted on the wheel to cooperate with the axle housing to form a closed chamber encompassing the discs, and means inserted between the two housing portions for preventing leakage of lubricant therefrom.

2. The combination with a driving axle of a motor vehicle, and a housing therefor having a radial flange formed thereon, of a drum secured to the flange in concentric relation to the axle and provided with an annular packing spaced a distance from the flange, an axially movable and adjustable sleeve mounted on the drum and provided with oppositely directed threads, a pair of opposed and spaced discs engaging the threaded sleeve, means mounted on the drum and engaging the discs for preventing rotation thereof, means for rotating the sleeve on the drum, a wheel revolubly mounted on the housing and fixedly connected to the axle, a flange mounted on the wheel to engage the packing on the drum, a double-faced disc mounted on the wheel between said opposed discs, and a flange mounted on the wheel to engage the sleeve to cooperate with the drum and wheel to form a closed chamber.

HENRY E. CURTIS.